(12) United States Patent
Wilkie et al.

(10) Patent No.: US 10,894,937 B2
(45) Date of Patent: Jan. 19, 2021

(54) FULVIC ACID AND HUMIC ACID MIX FOR ALCOHOLIC BEVERAGES METHOD AND DEVICES

(71) Applicants: Louise Wilkie, Surrey, CA (US); Jacqueline Wilkie, Surrey, CA (US)

(72) Inventors: Louise Wilkie, Surrey, CA (US); Jacqueline Wilkie, Surrey, CA (US)

( * ) Notice: Subject to any disclaimer, the term of this patent is extended or adjusted under 35 U.S.C. 154(b) by 0 days.

(21) Appl. No.: 16/751,562

(22) Filed: Jan. 24, 2020

(65) Prior Publication Data

US 2020/0318042 A1 Oct. 8, 2020

Related U.S. Application Data

(63) Continuation-in-part of application No. 16/377,210, filed on Apr. 7, 2019.

(51) Int. Cl.
*C12G 3/05* (2019.01)
*A23L 33/15* (2016.01)
(Continued)

(52) U.S. Cl.
CPC .................. *C12G 3/05* (2019.02); *A23L 2/02* (2013.01); *A23L 2/68* (2013.01); *A23L 33/15* (2016.08);
(Continued)

(58) Field of Classification Search
CPC .. C02F 1/265; C02F 1/30; C02F 1/004; C02F 2103/08; C02F 2303/04; C02F 2101/14; C02F 2209/06; C02F 2209/02; C02F 2103/26; C02F 2103/10; C02F 2103/007; C02F 1/008; C02F 1/02; C02F 1/32; C02F 1/68; C02F 1/685; C02F 1/686; C02F 1/78; C02F 9/00; C02F 2209/36; C02F 1/66; C02F 1/444; C02F 2101/12; C02F 2103/02; C02F 1/001; C02F 1/283; C02F 2303/16; C02F 2301/08; C02F 2209/05; C02F 1/4672; C02F 2209/29; A23L 3/003; A23L 2/72; A23L 3/00; A23L 3/001; A23L 3/005; A23L 3/3409; A23L 3/3418; A23L 2/38; A23L 2/42; A23L 2/48; A23L 2/50; A23L 2/52; A23L 2/60; A23L 2/68; A23L 2/78; A23L 33/105; A23L 2/58; A23L 2/56; A23L 2/02; A23L 33/16; A23L 33/155; A23L 33/15; B67C 7/0073; B67C 3/007; B67C 3/0073; B67C 2003/228;
(Continued)

(56) References Cited

U.S. PATENT DOCUMENTS 1,385,675 A * 7/1921 Holt ..................... B02C 23/00
241/34
2,380,800 A * 7/1945 Smith .................... C02F 1/003
210/683
(Continued)

*Primary Examiner* — Joseph W Drodge
(74) *Attorney, Agent, or Firm* — Edmond DeFrank

(57) ABSTRACT

The embodiments disclose a method including processing ingredients including carbon, essential vitamins, essential minerals, trace minerals, fulvic acid, and humic acid for preparation of black shot products, blending the ingredients processed into powders into powder based products, concentrating the ingredients processed into a liquid blend to create concentrated syrup products, blending the ingredients into a fresh fruit flavored smoothie, and blending the ingredients into a black shot beverage.

5 Claims, 14 Drawing Sheets

(51) Int. Cl.

| | |
|---|---|
| *A23L 33/16* | (2016.01) |
| *A23L 2/02* | (2006.01) |
| *A23L 2/68* | (2006.01) |
| *B01F 3/18* | (2006.01) |
| *B01F 3/20* | (2006.01) |
| *B01F 13/02* | (2006.01) |
| *A23P 10/22* | (2016.01) |
| *A23P 10/28* | (2016.01) |
| *B65B 25/00* | (2006.01) |
| *A23L 33/155* | (2016.01) |

(52) U.S. Cl.
CPC .............. *A23L 33/155* (2016.08); *A23L 33/16* (2016.08); *A23P 10/22* (2016.08); *A23P 10/28* (2016.08); *B01F 3/188* (2013.01); *B01F 3/2042* (2013.01); *B01F 3/2071* (2013.01); *B01F 13/0294* (2013.01); *B65B 25/001* (2013.01); *B01F 2215/007* (2013.01); *B01F 2215/0022* (2013.01)

(58) Field of Classification Search
CPC ...... B67C 3/023; A61K 33/00; A61K 31/185; A61K 31/19; A61K 36/00; A61K 36/899; A61K 9/0031; A61K 9/0095; A61K 9/02; A61K 9/025; A61K 9/08; C12G 3/04; C12G 3/08; C12G 3/085; C12G 3/055; C12G 3/06; C12G 3/05; C12C 12/00; C12C 12/002; A61L 2/0017; A61L 2/0023; A61L 2/0047; A61L 2/02; A61L 2/022; A61L 2/04; A61L 2/08; A61L 2/10; A61L 2/28; G06Q 50/02; B01D 1/00; B01D 5/00; B01D 11/0207; B01D 11/0288; B01D 11/028; B01D 29/00; B01D 29/0047; B01D 29/0052; B01D 29/0059; B01D 29/60; B01D 36/00; B01D 36/02; B65C 3/08; B65C 9/46; A23P 10/28; A23P 10/22; B65B 25/001; B01F 2215/0022; B01F 2215/007; B01F 3/2071; B01F 3/188; B01F 13/0294; B01F 3/2042; G16B 50/30
USPC ......... 210/85, 134, 143, 149, 175, 192, 335, 210/739, 764, 767, 774; 159/47.1; 424/725, 750; 426/419, 481, 615; 422/2, 422/3, 14, 22, 24, 28, 29, 40, 41; 99/275, 99/286, 287, 290, 537, 623; 604/285, 604/288; 206/528, 529; 514/966
See application file for complete search history.

(56) References Cited

U.S. PATENT DOCUMENTS

| | | | | |
|---|---|---|---|---|
| 6,326,032 | B1* | 12/2001 | Richter | A23G 9/30 252/186.23 |
| 10,421,670 | B1* | 9/2019 | Wilkie | A23L 3/28 |
| 2003/0134008 | A1* | 7/2003 | Kubota | A23L 2/52 426/74 |
| 2003/0150796 | A1* | 8/2003 | Heinig, Jr. | C02F 1/505 210/502.1 |
| 2004/0040909 | A1* | 3/2004 | Hirata | A61K 8/22 210/660 |
| 2004/0219056 | A1* | 11/2004 | Tribelsky | B65B 55/08 422/22 |
| 2006/0088632 | A1* | 4/2006 | Armes | C12H 1/16 426/271 |
| 2006/0198927 | A1* | 9/2006 | Hojo | A23L 2/44 426/74 |
| 2007/0154614 | A1* | 7/2007 | Sherwood | A23L 2/54 426/583 |
| 2007/0212434 | A1* | 9/2007 | Day | A61K 8/9741 424/762 |
| 2009/0199866 | A1* | 8/2009 | Kirkpatrick | A23L 2/50 134/3 |
| 2009/0242074 | A1* | 10/2009 | Carrig | H04W 4/08 141/26 |
| 2010/0121483 | A1* | 5/2010 | Junghans | B65G 59/02 700/218 |
| 2010/0316735 | A1* | 12/2010 | Belliston | A61K 31/375 424/682 |
| 2010/0317280 | A1* | 12/2010 | Detemple | E04B 2/7424 454/187 |
| 2011/0214779 | A1* | 9/2011 | Goldman | B67C 3/023 141/85 |
| 2011/0268846 | A1* | 11/2011 | Nair | A23G 1/56 426/73 |
| 2012/0111450 | A1* | 5/2012 | Claps | B01F 15/0291 141/297 |
| 2012/0213756 | A1* | 8/2012 | Petralia | A23L 2/54 426/583 |
| 2013/0138183 | A1* | 5/2013 | Martin | C02F 1/003 210/683 |
| 2013/0309331 | A1* | 11/2013 | Powell | A61K 33/30 424/725 |
| 2013/0337109 | A1* | 12/2013 | Hamaguchi | A23C 13/12 426/16 |
| 2013/0337116 | A1* | 12/2013 | Petralia | A61P 3/02 426/61 |
| 2014/0302163 | A1* | 10/2014 | Sanchez | A61P 3/02 426/61 |
| 2014/0373969 | A1* | 12/2014 | Goldman | B67C 3/208 141/9 |
| 2015/0329225 | A1* | 11/2015 | Moncayo, Jr. | A61K 8/9741 424/762 |
| 2016/0081976 | A1* | 3/2016 | Bromley | A61K 31/4745 424/456 |
| 2016/0095877 | A1* | 4/2016 | Martin | A23P 30/10 |
| 2018/0009686 | A1* | 1/2018 | Boyle | A61K 33/30 424/725 |
| 2019/0112564 | A1* | 4/2019 | Cyzen | C12G 3/023 |
| 2019/0302082 | A1* | 10/2019 | Cunningham | B65D 1/02 |
| 2020/0128869 | A1* | 4/2020 | Bell | A23P 30/10 |

* cited by examiner

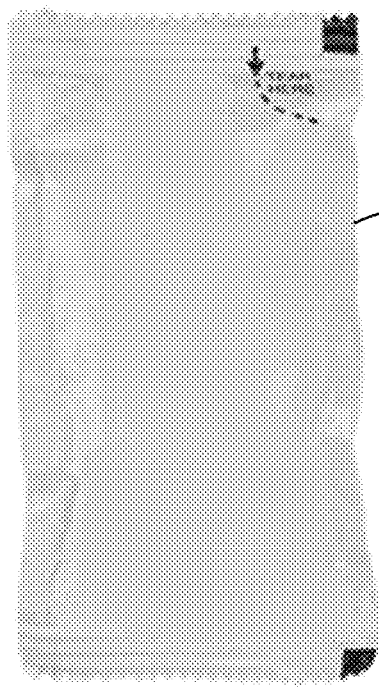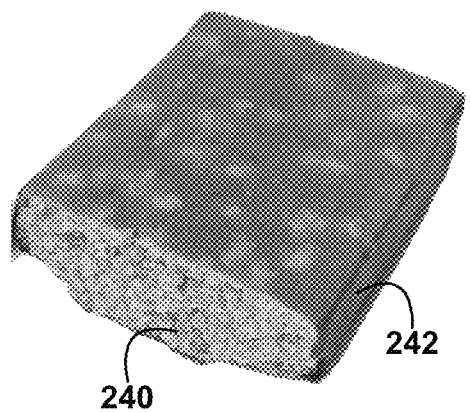
FIG. 11A  FIG. 11B
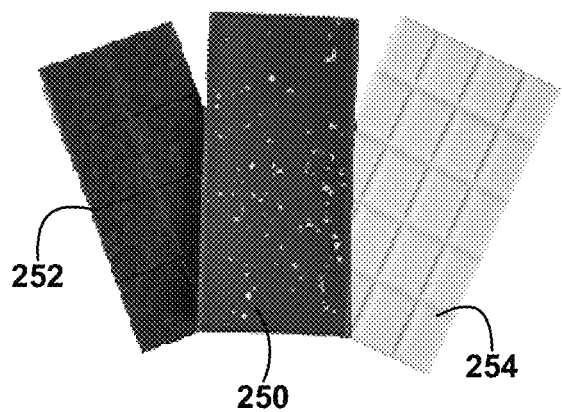
FIG. 11C

US 10,894,937 B2
1

FULVIC ACID AND HUMIC ACID MIX FOR ALCOHOLIC BEVERAGES METHOD AND DEVICES

CROSS-REFERENCE TO RELATED APPLICATIONS

This patent application is a Continuation-in part and claims priority to U.S. patent application entitled: "HUMIC AND FULVIC BLACK WATER BASED BEVERAGE FOR HUMAN CONSUMPTION", U.S. Ser. No. 16/377,210 filed on Apr. 7, 2019, the U.S. patent application being incorporated herein by reference.

BACKGROUND

It has been shown that higher atmospheric levels of CO2 result in less nutritious crop yields. Humans cannot disrupt most of the biophysical conditions to which we have adapted over millions of years, but must deal with the unanticipated impacts on our own health and wellbeing. Human, animals and plants are organic carbon-based organisms whose bodies require sufficient quantities of essential nutrients to maintain bodily functions. Changing climate and crop qualities may necessitate supplemental quantities of essential nutrients to be consumed to properly maintain the bodily functions.

BRIEF DESCRIPTION OF THE DRAWINGS

FIG. 11A shows for illustrative purposes only an example of black shot ingestible gel product of one embodiment.

FIG. 11B shows for illustrative purposes only an example of a black shot protein bar product of one embodiment.

FIG. 11C shows for illustrative purposes only an example of black shot chocolate bar products of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a fulvic acid and humic acid mix for alcoholic beverages method and devices is described for illustrative purposes and the underlying system can apply to any number and multiple types of foods and beverages. In one embodiment of the present invention, the fulvic acid and humic acid mix for alcoholic beverages method and devices can be configured using ingredients to create supplements for consumption in addition to routine daily dietary foods and beverages. The fulvic acid and humic acid mix for alcoholic beverages method and devices can be configured to include a single additive ingredient and can be configured to include multiple additive ingredients using the present invention.

Figure 1A:
FIG. 1A shows a block diagram of an overview a fulvic acid and humic acid mix for alcoholic beverages method and devices of one embodiment.

FIG. 1A shows a block diagram of an overview a fulvic acid and humic acid mix for alcoholic beverages method and devices of one embodiment. FIG. 1A shows an alcoholic drink 102 prepared and setting on a bar surface. A bartender can open a fulvic acid and humic acid mix packet 100 and pour and squeeze the fulvic acid and humic acid mix 103 for example a syrup, a gel, and a liquid into the drink and mix. A person consuming the drink also gets the vitamins, minerals and other ingredients included in the fulvic acid and humic acid mix packet 100 of one embodiment.

Figure 1B:
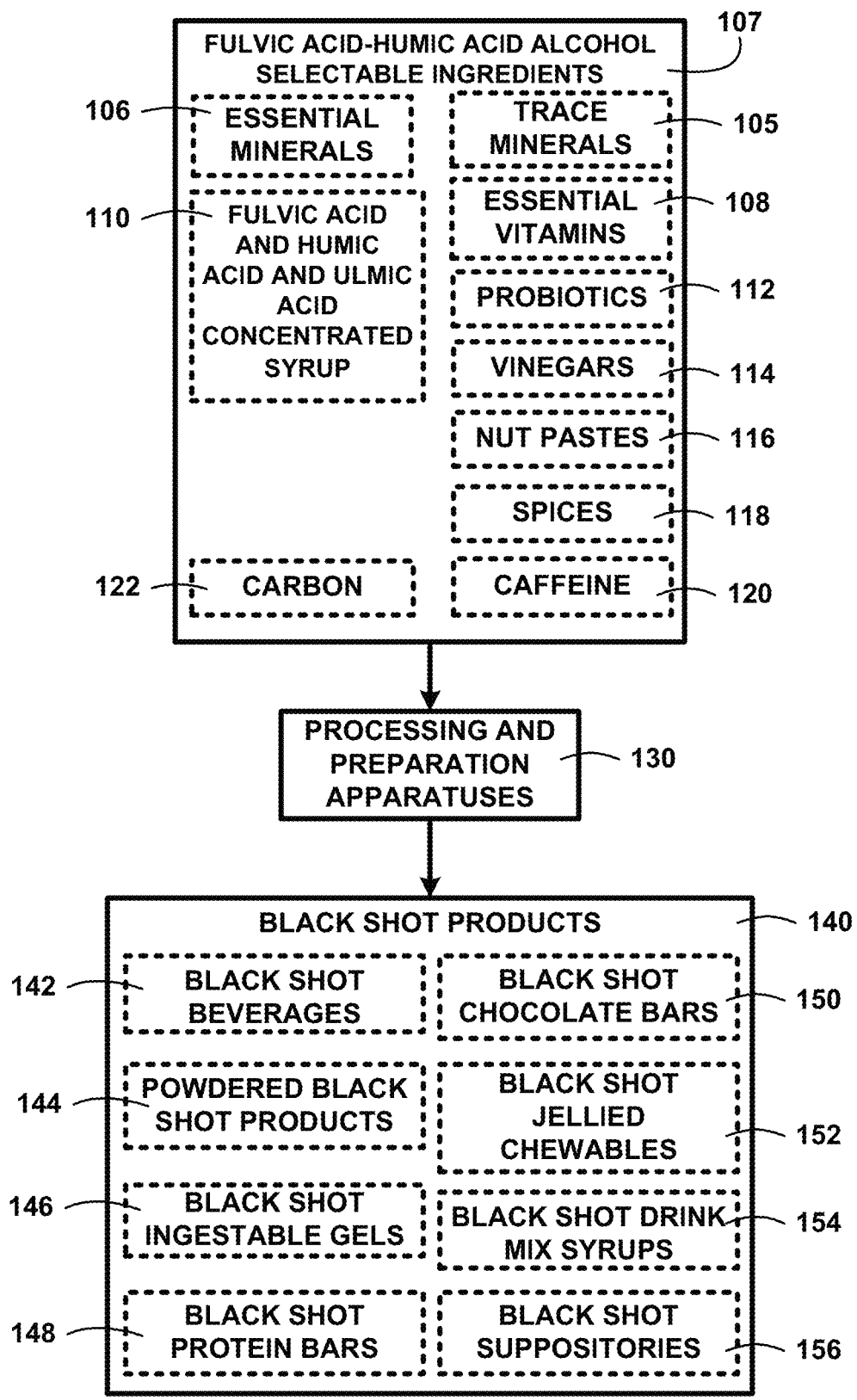
FIG. 1B shows a block diagram of an overview fulvic acid-humic acid alcohol selectable ingredients of one embodiment.

FIG. 1B shows a block diagram of an overview fulvic acid-humic acid alcohol selectable ingredients of one embodiment. FIG. 1B shows a group of fulvic acid-humic acid alcohol selectable ingredients 107 used in the preparation of a black shot product. The black shot selectable ingredients 107 include trace minerals 105, essential minerals 106, essential vitamins 108, fulvic acid and humic acid and ulmic concentrated syrup 110, probiotics 112, humic and fulvic acids 115, vinegars 114, nut pastes 116, spices 118, caffeine 120, and carbon 122.

The black shot selectable ingredients 100 may be selected singularly and in combinations for use in processing and preparation apparatuses 130 for producing black shot products 140. The black shot products 140 may be made in at least one of the following groups of products including black shot beverages 142, powdered black shot products 144, black shot ingestible gels 146, black shot protein bars 148, black shot chocolate bars 150, black shot jellied chewable candies 152, black shot drink mix syrups 154, and black shot suppositories 156.

Fulvic acid has a molecular structure of the vitamins and minerals d c37h33n1s1o33 molecule. Fulvic acid is well known for its health benefits due to the unique properties and abundance of the essential vitamins and minerals required by the human body for cellular level functions. It is abundantly clear that the fulvic acid molecule is replete with carbon molecules. Fulvic acid also includes amounts of the nutrition a person needs on a daily basis including many vitamins and minerals including the trace minerals of one embodiment.

During decomposition, organic matter releases millions of beneficial microbes and chemically active compounds containing a variety of beneficial nutrients. Fulvic acid is among the potent compounds released in the decomposition process. Among other nutritional benefits, fulvic acid contains an assortment of fatty acids, hormones, vitamins, minerals, ketones, and flavonoids, nutrients needed for healthy cell and body development. The alcohol-soluble portion of the humic fraction is, in general, named ulmic acid. So-called "gray humic acids" (GHA) are soluble in low-ionic-strength alkaline media; "brown humic acids" (BHA) are soluble in alkaline conditions independent of ionic strength; and fulvic acids (FA) are soluble independent of pH and ionic strength.

Fulvic acid contributes to improved digestive health, better nutrient absorption, fulvic acid combats vitamin and mineral deficiencies. Fulvic acid includes these nutrients 17 vitamins, 59 minerals, 12 amino acids and three essential fatty acids essential for proper cell and body development. It improves absorption of nutrients from the digestive tract into the bloodstream. Improved digestion includes gastrointestinal disorders, diarrhea, constipation, bloating, and flatulence. Fulvic acid also aids with increased energy flow, and boosts immune response. Fulvic acid is also known to be alkaline, this restores the body's optimal pH levels to improve the body's defenses against disease-causing microbes and toxins as well. Fulvic acid contributes to healthy skin, hair, and nails. Fulvic acid is a rich source of potent antioxidant, nutraceuticals, contains potent anti-inflammatory properties, aids in removal of toxins, promotes brain health and encourages muscle repair of one embodiment.

Humic acids are insoluble in water at acid pH, whereas fulvic acids are also derived from humic substances but are soluble in water across the full range of pH. Fulvic acids are poly-electrolytes and are unique colloids that diffuse easily through membranes whereas all other colloids do not. Fulvic acids are soluble in water across the full range of pH. Fulvic acid includes these nutrients 17 vitamins, 59 minerals, 12 amino acids and three essential fatty acids of one embodiment.

DETAILED DESCRIPTION

Figure 2:
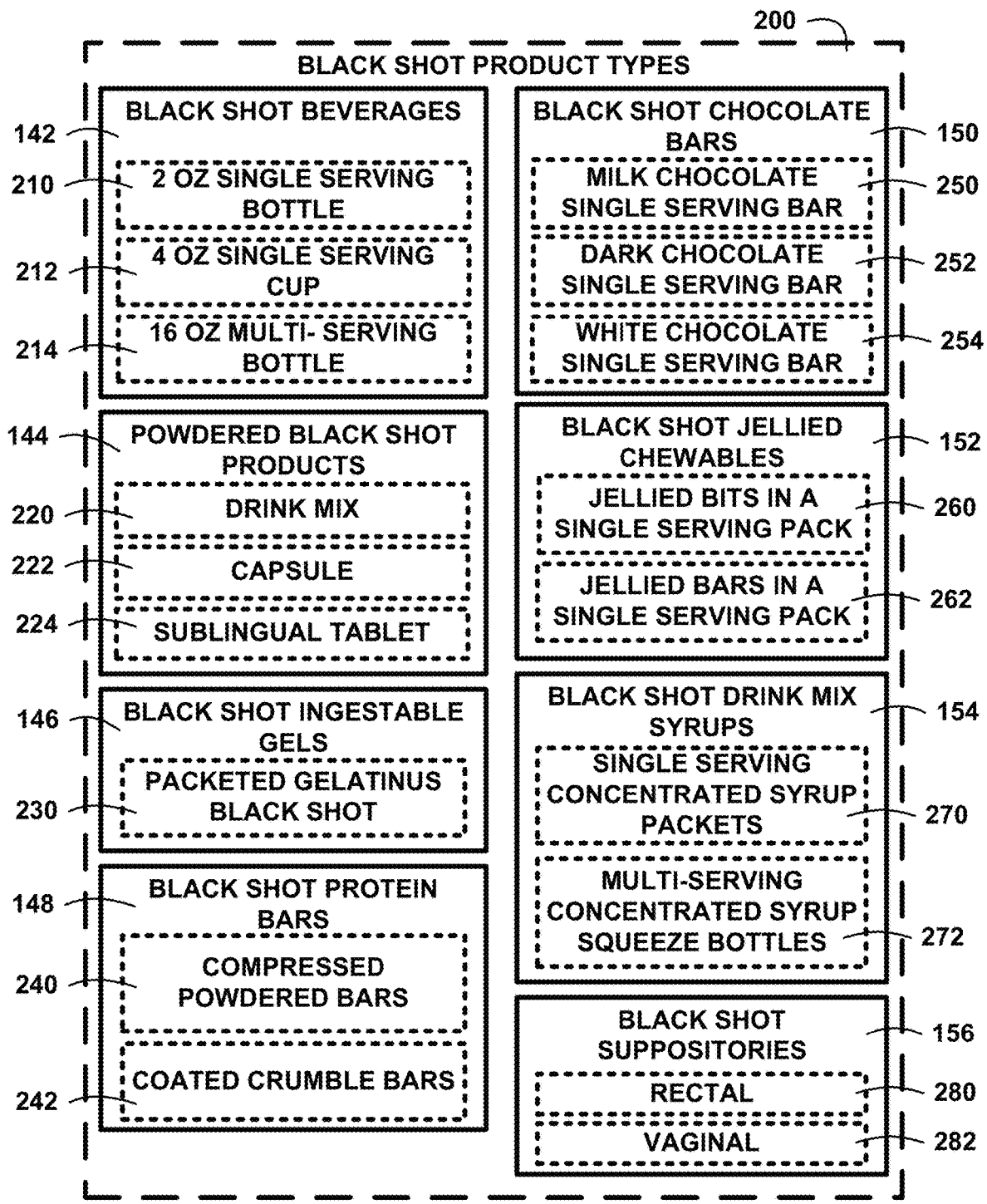
FIG. 2 shows a block diagram of an overview the black shot product types of one embodiment.

FIG. 2 shows a block diagram of an overview the black shot product types of one embodiment. FIG. 2 shows a group of black shot product types 200. The black shot product types 200 the black shot beverages 142 include at least one 2 oz. single serving bottle 210, 4 oz. single serving cup 212, and 16 oz. multi-serving bottle 214. The powdered black shot products 144 include at least one drink mix 220 that can be mixed with water or another liquid, a capsule 222 to be taken orally, and sublingual tablet 224 to be placed under the user tongue. The black shot ingestible gels 146 include at least one packet gelatinous black shot 230 that a user can suck out of the packet. The black shot protein bars 148 include compressed powdered bars 240 and coated crumble bars 242 that contain some crumbled forms of the ingredients. The black shot chocolate bars 150 include at least one of a group of a milk chocolate single serving bar 250, a dark chocolate single serving bar 252 and a white chocolate single serving bar 254 that can be flavored with juice from ingredients. The black shot jellied chewable 152 include jellied bits in a single serving pack 260 and jellied bars in a single serving pack 262 that can be bitten off by the user. The black shot drink mix syrups 154 include single serving concentrated syrup packets 270 and multi-serving concentrated syrup squeeze bottles 272. The black shot suppositories 156 include rectal 280 and vaginal 282 inserted suppositories of one embodiment.

Figure 3:
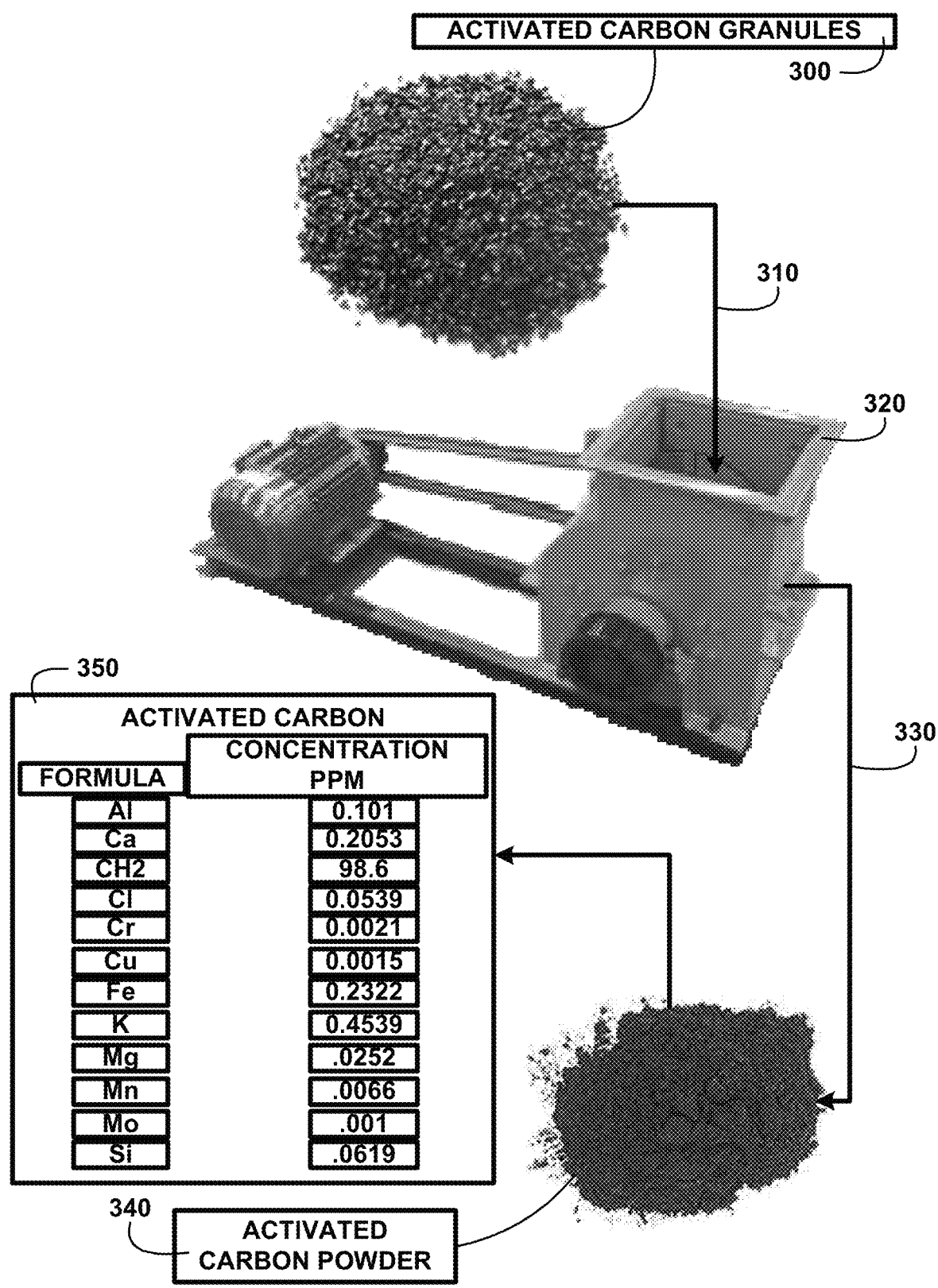
FIG. 3 shows for illustrative purposes only an example of a rock crusher pulverizing activated carbon granules into powder of one embodiment.

A Rock Crusher Pulverizing Activated Carbon Granules into Powder:

FIG. 3 shows for illustrative purposes only an example of a rock crusher pulverizing activated carbon granules into powder of one embodiment. FIG. 3 shows an example of a carbon ingredient with activated carbon granules 300. Activated carbon granules are placed into a rock crusher 310. A rock crusher 320 is used for pulverizing activated carbon granules into a powder 330. The result is an activated carbon powder 340. Activated carbon 350 components are displayed in a table of the elements in activated carbon by chemical formula and concentration in ppm of one embodiment.

Figure 4:
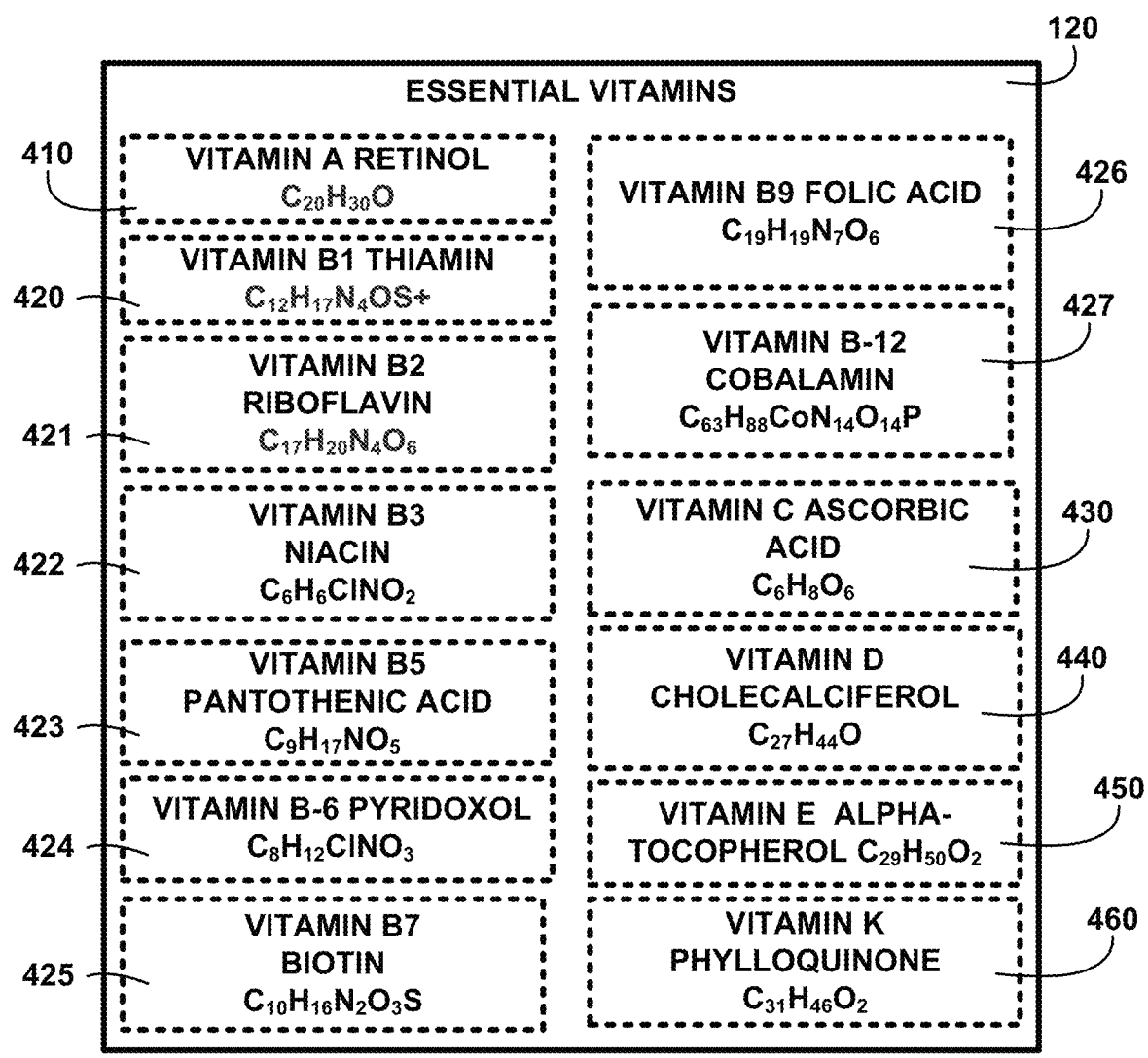
FIG. 4 shows a block diagram of an overview of essential vitamins of one embodiment.

Essential Vitamins:

FIG. 4 shows a block diagram of an overview of essential vitamins of one embodiment. FIG. 4 shows the essential vitamins 120 ingredients. The essential vitamins 120 include vitamin A retinol $C_{20}H_{30}O$ 410, vitamin B1 thiamin $C_{12}H_{17}N_4OS+$ 420, vitamin B2 riboflavin $C_{17}H_{20}N_4O_6$ 421, vitamin B3 niacin $C_6H_6CLNO_2$ 422, vitamin B5 pantothenic acid $C_9H_{17}NO_5$ 423, vitamin B-6 pyridoxol $C_8H_{12}ClNO_3$ 424, vitamin B7 biotin $C_{10}H_{16}N_2O_3S$ 425, vitamin B9 folic acid $C_{19}H_{19}N_7O_6$ 426, vitamin B-12 cobalamin $C_{63}H_{88}CON_{14}O_{14}P$ 427, vitamin C ascorbic acid $C_6H_8O_6$ 430, vitamin D cholecalciferol $C_{27}H_{44}O$ 440, vitamin E alpha-tocopherol $C_{29}H_{50}O_2$ 450, and vitamin K phylloquinone $C_{31}H_{46}O_2$ 460 of one embodiment.

Figure 5:
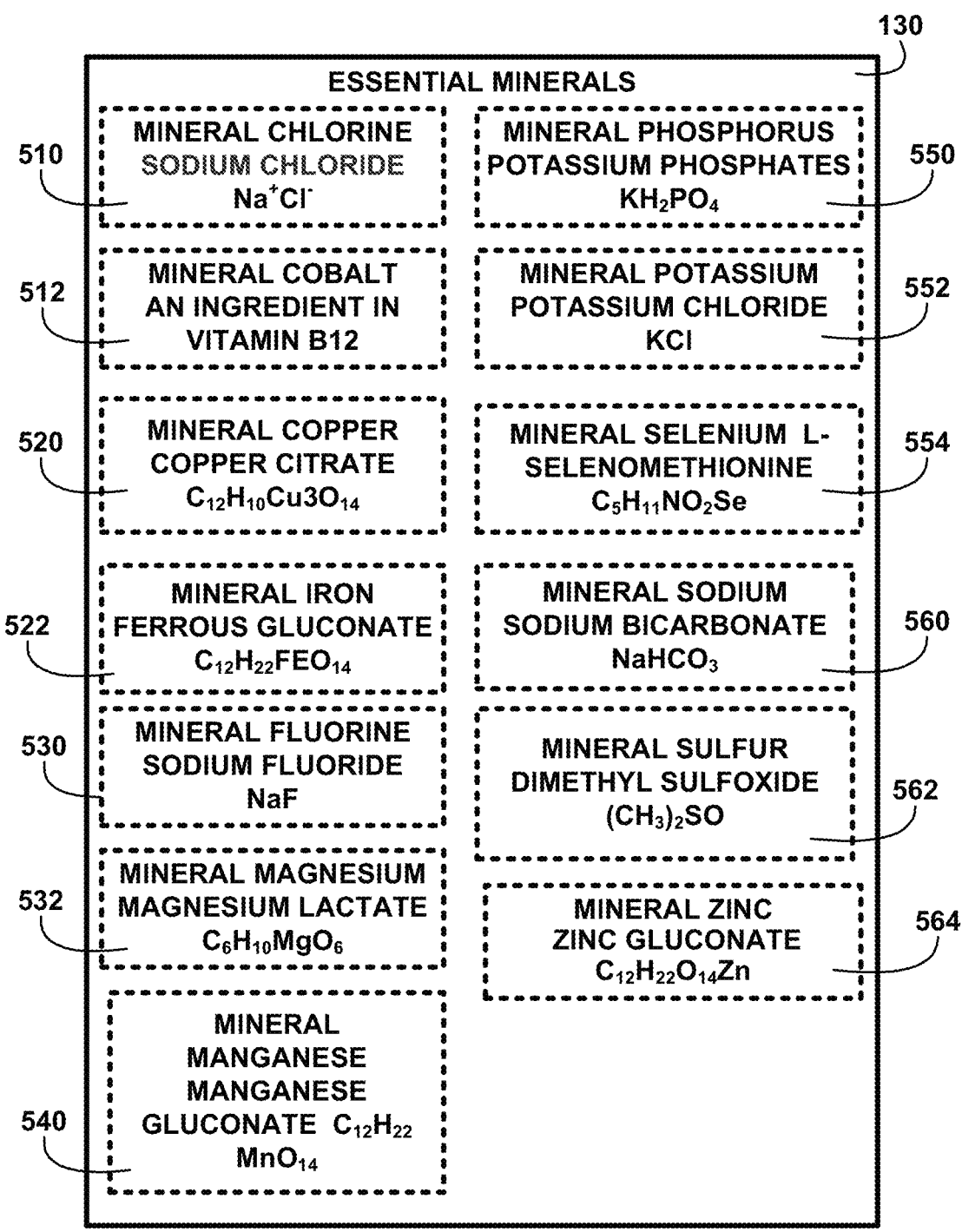
FIG. 5 shows a block diagram of an overview of essential minerals of one embodiment.

Essential Minerals:

FIG. 5 shows for illustrative purposes only an example of essential minerals of one embodiment. FIG. 5 shows the essential minerals 130 ingredients. The essential minerals 130 include the mineral chlorine sodium chloride $Na+Cl-$ 510, mineral cobalt an ingredient in vitamin B12 512, mineral copper copper citrate $C_{12}H_{10}Cu_3O_{14}$ 520, mineral iron ferrous gluconate $C_{12}H_{22}FEO_{14}$ 522, mineral fluorine sodium fluoride $NaF$ 530, mineral magnesium magnesium lactate $C_6H_{10}MgO_6$ 532, mineral manganese manganese gluconate $C_{12}H_{22}MnO_{14}$ 540, mineral phosphorus potassium phosphates $KH_2PO_4$ 550, mineral potassium potassium chloride $KCl$ 552, mineral selenium I-selenomethionine $c5h11no2se$ 554, mineral sodium sodium bicarbonate $NaHCO_3$ 560, mineral sulfur dimethyl sulfoxide $(CH_3)_2SO$ 562, and mineral zinc zinc gluconate $C_{12}H_{22}O_{14}Zn$ 564 of one embodiment.

Figure 6A:
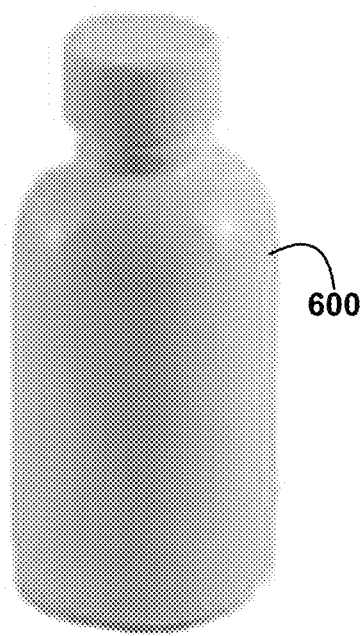
FIG. 6A shows for illustrative purposes only an example of a 2 oz. white plastic black shot bottle of one embodiment.

A 2 Oz. White Plastic Black Shot Bottle:

FIG. 6A shows for illustrative purposes only an example of a 2 oz. white plastic black shot bottle of one embodiment. FIG. 6A shows a 2 oz. white plastic black shot bottle 600 of one embodiment.

Figure 6B:
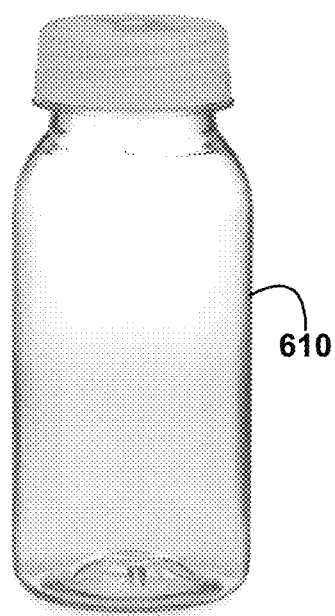
FIG. 6B shows for illustrative purposes only an example of a 2 oz. clear black shot bottle of one embodiment.

A 2 Oz. Clear Black Shot Bottle:

FIG. 6B shows for illustrative purposes only an example of a 2 oz. clear black shot bottle of one embodiment. FIG. 6B shows a 2 oz. clear black shot bottle 610. The 2 oz. clear black shot bottle 610 may be made of a clear PET plastic. The 2 oz. clear black shot bottle 610 may be made of a clear glass of one embodiment.

Figure 6C:
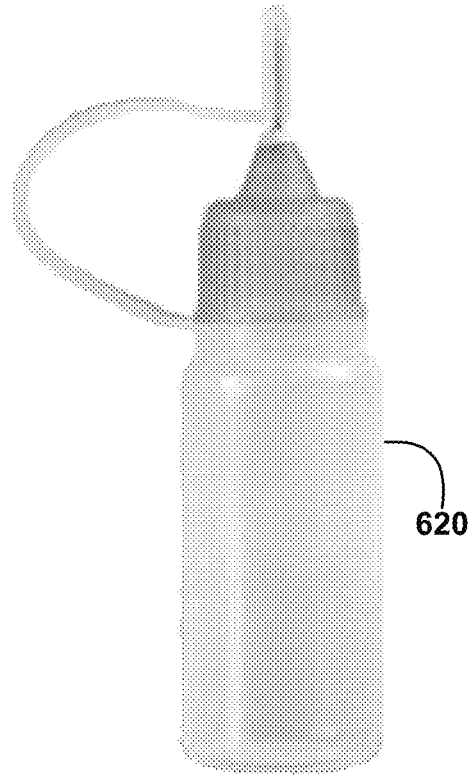
FIG. 6C shows for illustrative purposes only an example of a 2 oz. plastic black shot needle bottle of one embodiment.

A 2 Oz. Plastic Black Shot Needle Bottle:

FIG. 6C shows for illustrative purposes only an example of a 2 oz. plastic black shot needle bottle of one embodiment. FIG. 6C shows a 2 oz. plastic black shot needle bottle

620. The 2 oz. plastic black shot needle bottle 620 includes a snap on and off cap that is attached with a strap. The 2 oz. plastic black shot needle bottle 620 allows a user to either suck or squirt the black shot into the user mouth of one embodiment.

Figure 7:
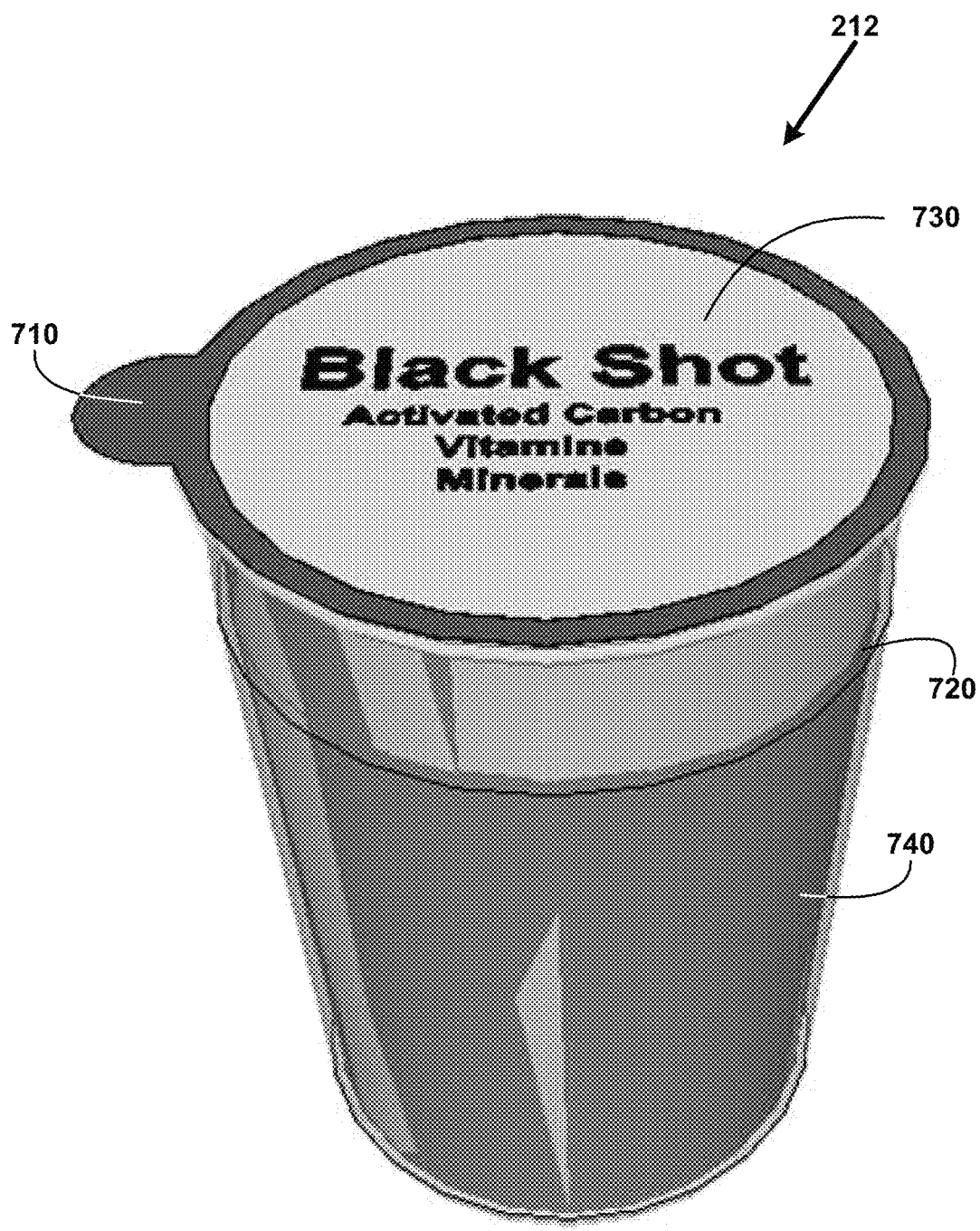
FIG. 7 shows for illustrative purposes only an example of a 4 oz. black shot cup of one embodiment.

A 4 Oz. Black Shot:

FIG. 7 shows for illustrative purposes only an example of a 4 oz. black shot of one embodiment. FIG. 7 shows a black shot 4 oz. single serving cup 212. The black shot 4 oz. single serving cup 212 is packaged in a cup 720 container that is clear to translucent. The black colored black shot mixture 740 shows through the cup 720. The cup 720 has a foil cover 730 with a pull tab 710 for user ease of opening of one embodiment.

Figure 8A:
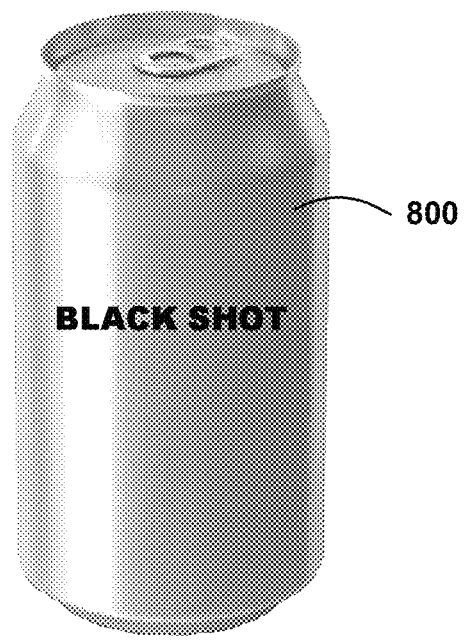
FIG. 8A shows for illustrative purposes only an example of a black shot in a beverage can of one embodiment.

A Black Shot in a Beverage Can:

FIG. 8A shows for illustrative purposes only an example of a black shot in a beverage can of one embodiment. FIG. 8A shows a black shot in a beverage can 800 of one embodiment.

Figure 8B:
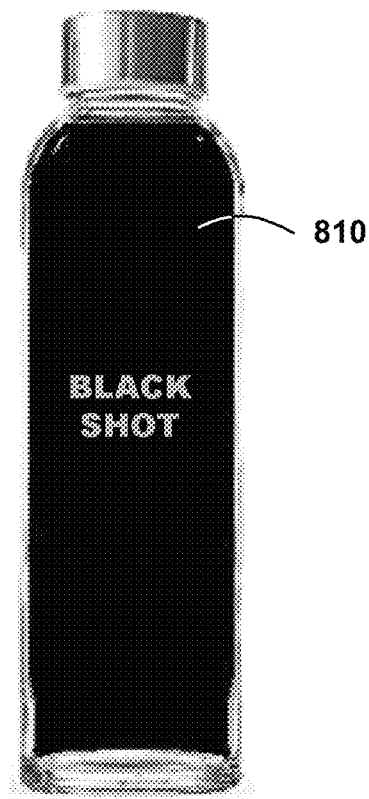
FIG. 8B shows for illustrative purposes only an example of a black shot in a glass bottle of one embodiment.

A Black Shot in a Glass Bottle:

FIG. 8B shows for illustrative purposes only an example of a black shot in a glass bottle of one embodiment. FIG. 8B shows a black shot in a glass bottle 810. The clear glass allows the black colored black shot mixture to show through of one embodiment.

Figure 9:
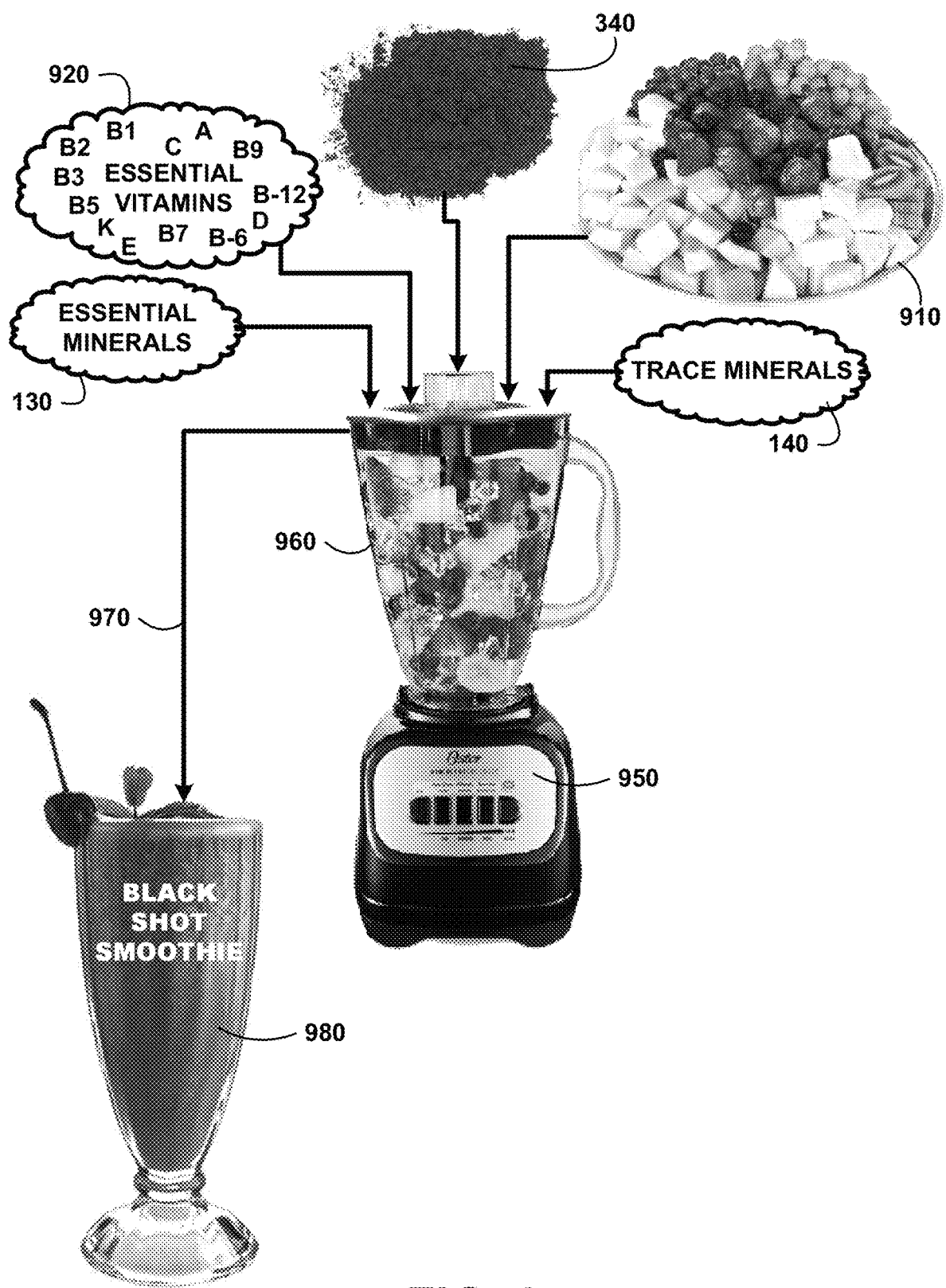
FIG. 9 shows for illustrative purposes only an example of a fresh fruit black shot smoothie of one embodiment.

A Fresh Fruit Black Shot Smoothie:

FIG. 9 shows for illustrative purposes only an example of a fresh fruit black shot smoothie of one embodiment. FIG. 9 shows the activated carbon powder 340, essential vitamins A, B1, B2, B3, B5, B-6, B7, B9, B-12, C, D, E, K 920, essential minerals 106, fulvic acid 104, trace minerals 124 and other black shot selectable ingredients 100. Added to the ingredients 100 is fresh fruit 910. An automated system device may be used to add one particular fresh fruit or a combination of multiple fresh fruits to taste. The ingredients are deposited into a blender device 960. A blender device 950 may include a commercial blender. A blender device 950 may include a large volume device to mass produce the blended beverage for packaging in containers wherein containers are filled while being conveyed on a conveyor. In this example blended ingredients are poured into a container 970. FIG. 9 shows a container filled with a black shot smoothie 980 of one embodiment.

Figure 10:
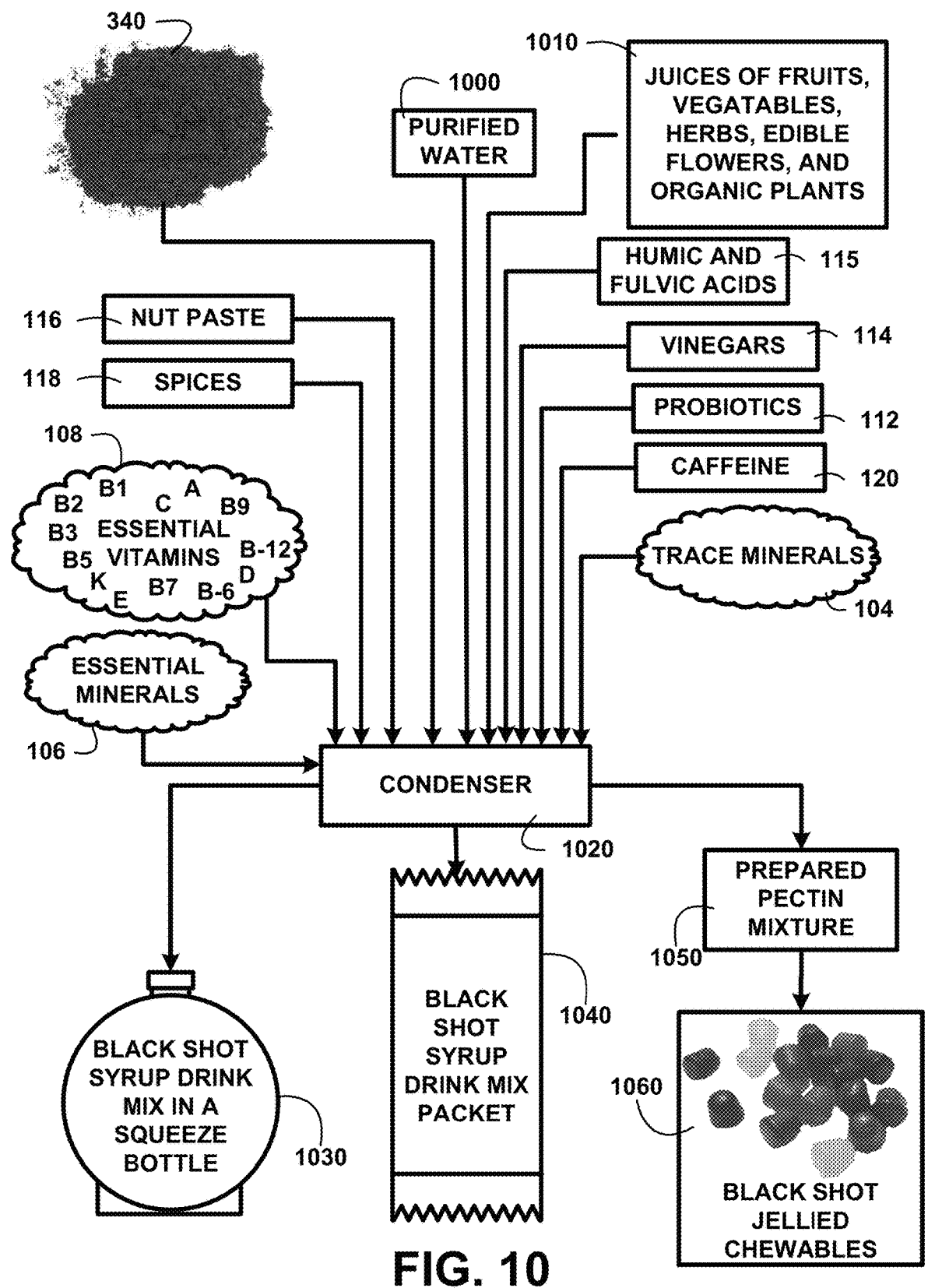
FIG. 10 shows for illustrative purposes only an example of black shot concentrated syrup products of one embodiment.

Black Shot Concentrated Syrup Products:

FIG. 10 shows for illustrative purposes only an example of black shot concentrated syrup products of one embodiment. FIG. 10 shows the activated carbon powder 340, essential vitamins A, B1, B2, B3, B5, B-6, B7, B9, B-12, C, D, E, K 108, essential minerals 106, fulvic acid 104, trace minerals 124, nut paste 116, spices 118, probiotics 112, humic and fulvic acids 115, vinegars 114, caffeine 120, humic acid 102, fulvic acid 104, purified water 1000 and juices of fruits, vegetables, herbs, edible flowers, and organic plants 1010 ingredients. The ingredients are processed in a black shot liquid mixture condenser 1020 that removes a predetermined amount of the water from the mixture to create a concentrated syrup consistency. The black shot concentrated syrup product may be used to add to water to create a beverage. The black shot concentrated syrup product may be packaged for consumer use. Consumer use packaging may include for example a black shot concentrated syrup product squeeze bottle 1030. Another example of a consumer use packaging may include a black shot syrup drink mix packet 1040 the user can tear open and pour the black shot syrup into a hot or cold water or other beverage. The condensed mixture may be blended with a prepared pectin mixture 1050 to produce black shot jellied chewable 1060 of one embodiment.

Gelatinous Black Shot:

FIG. 11A shows for illustrative purposes only an example of black shot ingestible gel product of one embodiment. FIG. 11A shows a black shot ingestible gels 146 of FIG. 1 including at least one gelatinous packet black shot 230 that a user can suck out of the packet of one embodiment.

Black Shot Protein Bar:

FIG. 11B shows for illustrative purposes only an example of a black shot protein bar product of one embodiment. FIG. 11B shows an example of black shot protein bars 148 of FIG. 1 including at least one compressed powdered protein bar 240 and at least one compressed powdered protein bar coating 242 that contains some crumbled forms of the ingredients of one embodiment.

Black Shot Chocolate Bars:

FIG. 11C shows for illustrative purposes only an example of black shot chocolate bar products of one embodiment. FIG. 11C shows the black shot chocolate bars 150 of FIG. 1 including for example at least one of a group of a milk chocolate single serving bar 250, a dark chocolate single serving bar 252 and a white chocolate single serving bar 254. The black shot chocolate bars 150 of FIG. 1 may be flavored with juice from ingredients of one embodiment.

Figure 12:
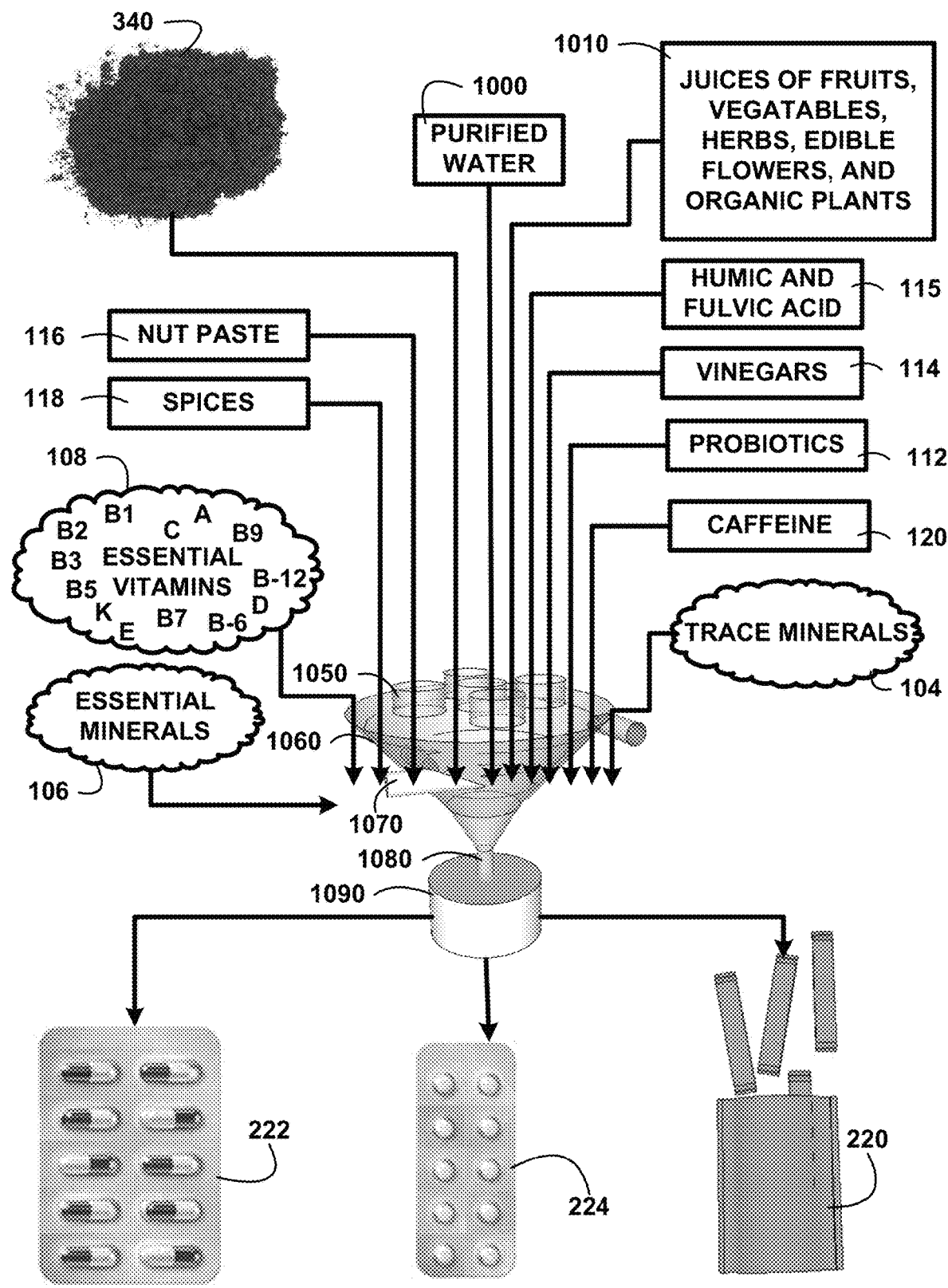
FIG. 12 shows for illustrative purposes only an example of black shot powdered products of one embodiment.

Black Wellness Powdered Products:

FIG. 12 shows for illustrative purposes only an example of black shot powdered products of one embodiment. FIG. 12 shows the activated carbon powder 340, powdered essential vitamins A, B1, B2, B3, B5, B-6, B7, B9, B-12, C, D, E, K 1020, powdered essential minerals 1030, powdered fulvic acid 1040, powdered trace minerals 124 and powdered fruit flavorings 1010. The powdered ingredients are deposited through powder inlets 1050 into a turbulent air blender 1060. Multiple air flow inlets 1070 provide air streams used to blend the powdered ingredients. The turbulent air flow forms a vortex that as the volume of powdered ingredients are blended the blend is carried through a turbulent air blended powdered ingredient outlet 1080 to at least one product processor 1090. The at least one product processor 1090 may be configured to process the blended powder 150 into drink mix 152 packets that may be further packaged in a larger packet of multiple drink mix 152 packets. The at least one product processor 1090 may be configured to fill and join at least one capsule 154 container that may be packaged in sets of multiple capsules or packaged in a bottle. The at least one product processor 1090 may be configured to compress the turbulent air blended powdered ingredients into tablets and packaged including for example a sublingual tablet 156 of one embodiment.

Figure 13:
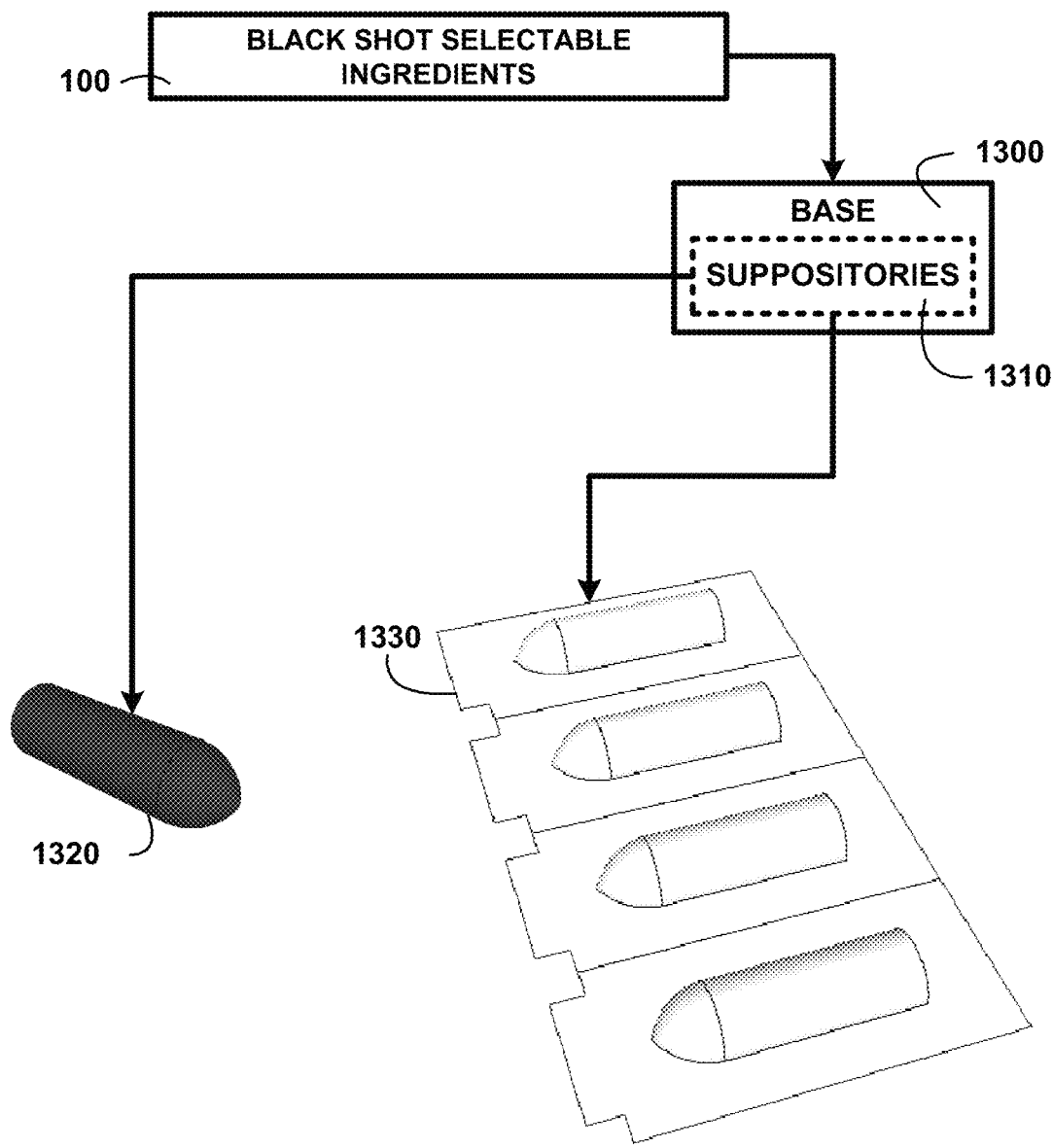
FIG. 13 shows for illustrative purposes only an example of a black shot suppository of one embodiment.

A Black Shot Suppository:

FIG. 13 shows for illustrative purposes only an example of a black shot suppository of one embodiment. FIG. 13 shows the black shot selectable ingredients 100 are blended with a suppository base 1300 material, for example a gel base 1300. The base 1300 blended ingredients 100 are formed into suppositories 1310 including a black colored carbon suppository 1320. The black colored carbon suppository 1320 units are packaged black colored carbon suppositories 1330 using an antiseptic suppository packaging device of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. An apparatus, comprising:
   at least one device for processing and blending ingredients including carbon powder, essential vitamins, essential minerals, trace minerals, fulvic acid, and humic acid for preparation of black shot products;
   at least one product processor configured for processing turbulent air blended powdered ingredients into the black shot products;
   at least one device configured for pulverizing activated carbon granules into the carbon powder: and
   at least one device configured for preparation and packaging one or more of the black shot products including beverages, capsules, suppositories, tablets, powdered drink mixes and concentrated black shot syrup for mixing beverages.

2. The apparatus of claim 1, wherein the at least one device for processing and blending ingredients is configured for processing the essential minerals, the minerals including chlorine, cobalt, copper, fluorine, magnesium, phosphorus, potassium, sodium, sulfur and zinc, into a powder.

3. The apparatus of claim 1, further comprising an antiseptic suppository packaging device configured for packaging blended ingredients with a base material for producing suppositories.

4. The apparatus of claim 1, further comprising an antiseptic suppository packaging device for processing and blending ingredients configured for pulverizing activated carbon granules into a powder packaging black colored carbon suppositories.

5. The apparatus of claim 1, wherein the at least one device for processing and blending ingredients is configured for processing the essential vitamins, the essential vitamins including A, B1, B2, B3, B5, B-6, B7, B9, B-12, C, D, E, and K, into a powder.

* * * * *